Patented Aug. 9, 1932

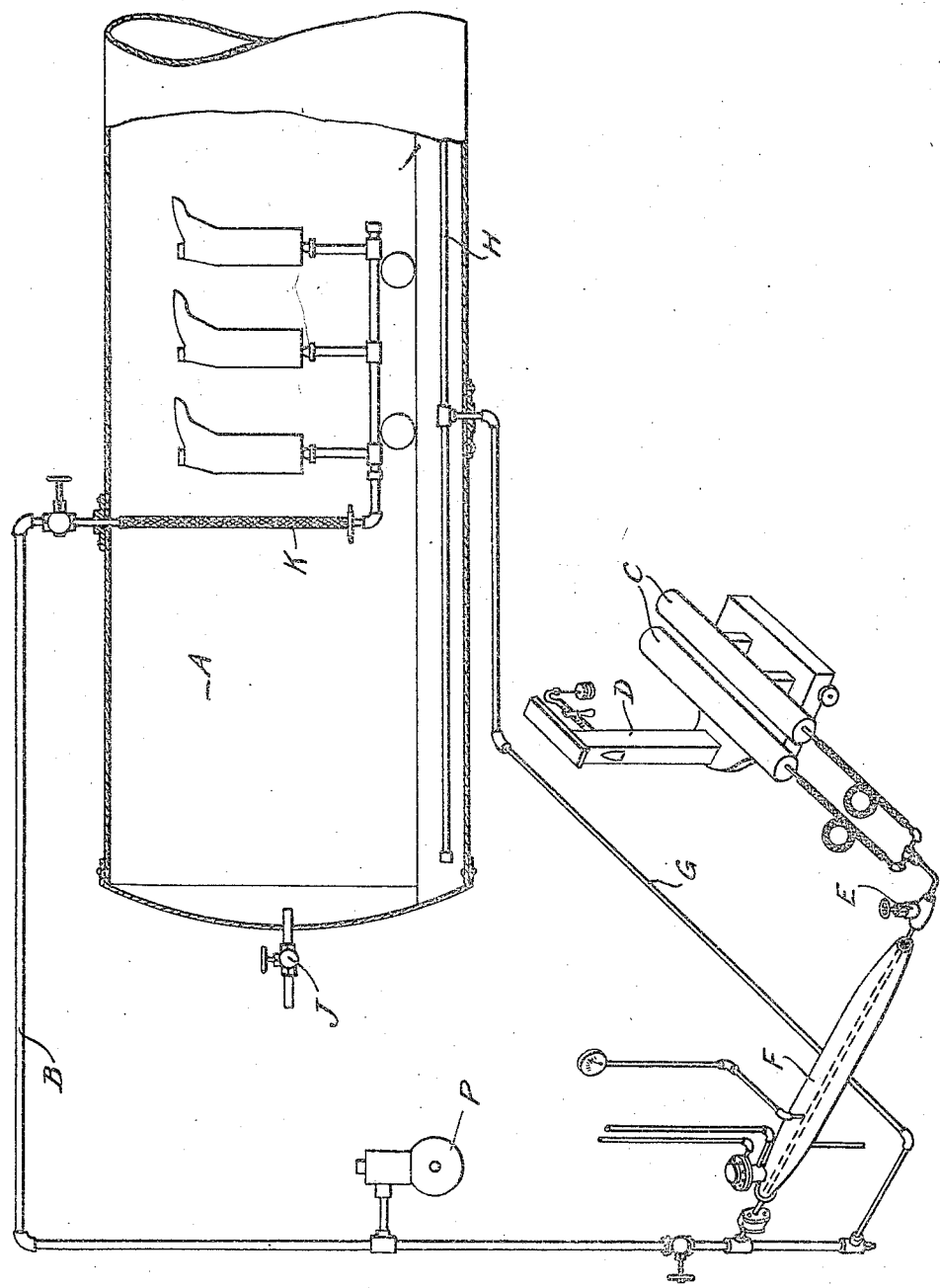

1,871,083

UNITED STATES PATENT OFFICE

CHESTER J. RANDALL, OF WOONSOCKET, RHODE ISLAND, ASSIGNOR TO THE GOODYEAR'S INDIA RUBBER GLOVE MFG. COMPANY, OF NAUGATUCK, CONNECTICUT, A CORPORATION OF CONNECTICUT

VULCANIZATION OF RUBBER

Application filed June 9, 1930. Serial No. 459,924.

This invention relates to improvements in methods and apparatus for vulcanizing articles embodying rubber or similar materials, more particularly where vulcanization of the same includes the use of what is known as a differential of pressure treatment.

Ordinarily in a differential of pressure cure system, the goods, such as boots, shoes, etc., built on hollow forms or lasts, are placed in a closed type of vulcanizer. Afterwards compressed air is introduced into the vulcanizer and while the temperature of the vulcanizer is raised, a reduced or low pressure is applied to the interior of the form and goods. In practice there is a certain amount of leakage between the rubber article and the form. The air withdrawn from the interior of the goods is circulated and delivered back into the vulcanizer. Thus there is produced between the inner and outer sides of the article a differential of pressure. This procedure produces an increased compacting and densifying of the goods and removes trapped gases and like from the article. It is kept up as long as desired, depending on the article treated. Final vulcanization is carried out while an increased air pressure is maintained on the exterior of the goods.

Rubber containing the usual compounding ingredients including sulphur, organic accelerator, and metal in combination such as zinc oxide, has its properties markedly improved when the rubber is vulcanized in the presence of a basic gas such as ammonia under pressure. The rubber becomes stiffer, more resistant to marring, less tacky, and has an improved surface appearance. There are various obstacles to applying the use of ammonia to a differential of pressure system. Ammonia is ordinarily confined as a liquid under pressure and has decided tendencies toward refrigeration effects when released. It furthermore, if it is to be employed in a differential of cure system to obtain the mentioned desired results, has to be managed and regulated in a manner causing practically no sacrifice of efficiency of the system. Also there should be maintenance of the differential of pressure feature without causing the ammonia gas to enter the pumping system and the gas should be in such condition and under such proper control of pressure and temperature as to cause no delays incident to the nature of the gas. The pressure of the ammonia also has to be sufficient to overcome the counter pressure of the compressed air present in the vulcanizer, which is usually from about 20 to about 30 pounds gauge pressure. These and other difficulties are herein overcome in an economical and efficient manner.

The invention can be readily understood from the following description, taken in connection with the accompanying drawing in which the apparatus is shown in part sectionally and in part elevationally.

In carrying out the invention the goods, such as boots, disposed on lasts and carried by movable trucks or cars are loaded into vulcanizer A. The car frame carries conduits leading from the interior of the lasts or forms, which allow of connection in any suitable way, as by flexible conduits K or otherwise to the low pressure lines leading to the pump P. After closing the door compressed air is admitted into the vulcanizer to a gauge pressure of about 19 pounds. Steam is admitted to the heating coils inside the vulcanizer and the temperature of the air surrounding the goods raised in accordance with the predetermined temperature cure that is to be carried out. When the temperature reaches about 220° F. the differential pressure is applied through the agency of the customary pump and low pressure line which has by this time been connected to the truck conduits leading to the interior of the goods. Air is drawn from the interior of the goods and delivered back into the vulcanizer through the air line B and its connecting line G to the perforated header H. This is continued for only a few minutes in the case of boots. Then all valves leading to the pumps are closed to exclude ammonia and ammonia is admitted to the vulcanizer as follows: Liquid ammonia under high pressure is drawn from the cylinders C, the loss in weight being indicated on scales D showing the quantity of ammonia taken. The liquid ammonia passes through a valve E which allows the ammonia to somewhat expand. The expanded ammonia together with any liquid ammonia passes into a steam jacketed heater or vaporizer F and from there the ammonia gas passes to H and A either by means of conduit G as shown, or by means of a conduit directly connected from F to A, in which case the ammonia would not have to pass through G. Ordinarily in a 21-foot vulcanizer, 15 pounds by weight of ammonia may be used. This ammonia together with the 19 lbs. air pressure gives a total gauge pressure of about 25 pounds.

The ammonia inlet is then closed and the heating of the vulcanizer continued sufficiently to vulcanize the goods. No more ammonia or air is added during vulcanization. After the final heat the air and ammonia are exhausted to the atmosphere through valve J, and further traces of ammonia may be removed by admitting about 10 pounds gauge pressure of air and exhausting a couple of times. The goods are then removed and cooled.

Having thus described my invention, what I claim and desire to protect by Letters Patent is:

1. In a process of vulcanizing rubber articles under a differential of pressure, the steps of creating a reduced pressure in the interior of the articles, and a pressure greater than atmospheric on the exterior of the articles, releasing the reduced pressure, then introducing into the vulcanizer ammonia gas under pressure while maintaining the air pressure greater than atmospheric.

2. In a process of vulcanizing rubber articles under a differential of pressure, the steps of creating a reduced pressure in the interior of the articles and a pressure greater than atmospheric on the exterior of the articles, releasing the reduced pressure, then introducing into the vulcanizer ammonia gas under pressure while maintaining the air pressure greater than atmospheric and vulcanizing the articles so confined.

3. In a differential of pressure cure apparatus comprising a vulcanizing chamber, the combination with the vulcanizing chamber and a source of compressed air, of a source of ammonia leading to said chamber, and means for expanding and vaporizing the ammonia during the passage of the ammonia to said vulcanizing chamber.

4. In a differential pressure cure apparatus comprising a vulcanizing chamber, the combination with the vulcanizing chamber and a source of compressed air leading by means of conduits to said chamber, of a source of ammonia under pressure leading to said chamber and branched to the compressed air conduits, and means for expanding and vaporizing the ammonia after its release from the ammonia source and before it reaches the vulcanizing chamber.

5. In a differential of pressure cure apparatus comprising a vulcanizing chamber, the combination with the vulcanizing chamber and a source of compressed air leading by means of conduits and valves to said chamber, of a source of ammonia under pressure, a jacketed heater for the ammonia leading directly to said vulcanizer and connected to the source of ammonia, and a valve between the heater and the source of ammonia.

6. In a process of vulcanizing rubber articles under a differential of pressure, the steps of subjecting the articles to a vulcanizing heat treatment in air under pressure and containing ammonia, and during a portion of the vulcanizing heat treatment subjecting the interior of the article to a pressure less than atmospheric.

Signed at Woonsocket, county of Providence, State of Rhode Island, this 28th day of May, 1930.

CHESTER J. RANDALL.